US008995842B1

(12) United States Patent
Kojima et al.

(10) Patent No.: US 8,995,842 B1
(45) Date of Patent: Mar. 31, 2015

(54) SECURED OPTICAL COMMUNICATIONS USING QUANTUM ENTANGLED TWO-PHOTON TRANSPARENCY MODULATION

(75) Inventors: Jun Kojima, Strongsville, OH (US); Quang-Viet Nguyen, Richmond Heights, OH (US); John Lekki, Elyria, OH (US)

(73) Assignee: The United States of America as Represented by the Administrator of National Aeronautics and Space Administrator, Washington, DC (US)

( * ) Notice: Subject to any disclaimer, the term of this patent is extended or adjusted under 35 U.S.C. 154(b) by 560 days.

(21) Appl. No.: 12/536,969

(22) Filed: Aug. 6, 2009

(51) Int. Cl.
*H04B 10/11* (2013.01)
*H04B 10/70* (2013.01)

(52) U.S. Cl.
USPC .......................... 398/131; 398/118

(58) Field of Classification Search
USPC .......................... 398/118, 129, 131
See application file for complete search history.

(56) References Cited

U.S. PATENT DOCUMENTS

| | | | |
|---|---|---|---|
| 5,418,905 A | 5/1995 | Rarity et al. | |
| 6,678,054 B1 | 1/2004 | Dress et al. | |
| 6,897,434 B1 | 5/2005 | Kumar et al. | |
| 2002/0097874 A1 | 7/2002 | Foden et al. | |
| 2002/0106084 A1 | 8/2002 | Azuma et al. | |
| 2003/0133714 A1 | 7/2003 | Gat | |
| 2004/0208638 A1 | 10/2004 | Jansen | |
| 2004/0250111 A1 | 12/2004 | Flusberg et al. | |
| 2004/0258421 A1* | 12/2004 | Conti et al. ................... | 398/183 |
| 2005/0093632 A1* | 5/2005 | Alenin ......................... | 330/264 |
| 2005/0094142 A1 | 5/2005 | Takeuchi | |

OTHER PUBLICATIONS

Mankei Tsang et al.; Quantum temporal imaging, Lasers and Electro-Optics, 2006 and 2006 Quantum Electronics and Laser Science Conference. CLEO/QELS 2006. pp. 1-2, May 21-26, 2006; doi: 10.1109/CLE0.2006.4629150; URL: http://ieeexplore.ieee.org/stamp/stamp.jsp?tp=&arnumber=4629150&isnumber=4627561.*
Dayan et al.; Temporal Shaping of Entangled Photons, Phys. Rev. Lett. 94, 073601 (2005).*

* cited by examiner

*Primary Examiner* — Nathan Curs
(74) *Attorney, Agent, or Firm* — Robert M. Earp, III

(57) ABSTRACT

A system and method is disclosed wherein optical signals are coded in a transmitter by tuning or modulating the interbeam delay time (which modulates the fourth-order coherence) between pairs of entangled photons. The photon pairs are either absorbed or not absorbed (transparent) by an atomic or molecular fluorescer in a receiver, depending on the interbeam delay that is introduced in the entangled photon pairs. Upon the absorption, corresponding fluorescent optical emissions follow at a certain wavelength, which are then detected by a photon detector. The advantage of the disclosed system is that it eliminates a need of a coincidence counter to realize the entanglement-based secure optical communications because the absorber acts as a coincidence counter for entangled photon pairs.

20 Claims, 3 Drawing Sheets

SECURED OPTICAL COMMUNICATIONS USING QUANTUM ENTANGLED TWO-PHOTON TRANSPARENCY MODULATION

FIELD OF THE INVENTION

The present invention relates to a method and architecture for secure optical communications using quantum entangled photon transparency modulation spectroscopy

BACKGROUND OF THE INVENTION

Free-space optical technologies may be used as a means of ground, airborne and space-based digital communications and surveillance because of the cost-effectiveness, high-bandwidth and/or enhanced security associated with these technologies. Typically, commercially available optical communications systems may use near-infrared (NIR) lasers to provide a direct point-to-point, high-speed link through the atmosphere, over several kilometers, with a large available bandwidth. Optical communications based on non-linear and quantum optics have been proposed and developed to provide virtually unbreakable security during data transfer. Among these techniques are interferometric communications and retro-modulation communications. These techniques typically rely on photon flux modulation and/or second-order coherent phase modulation to transfer information.

With quantum cryptography or quantum key distribution, any attempt to intercept a data link would fails, thus ensuring a high degree of security. The challenge of this cryptographic technique, however, is that any practical implementation may require coincidence-count, post-processing with a separated and secondary data transmission through conventional channels, such as through physical wiring or another wireless network. While this technique may be suitable for fiber-optic communications, it may not be preferred in free-space communications, particularly communications in military systems.

Another state-of-the-art technique may use near-simultaneously generated quasi-entangled photons for communications to significantly increase immunity to background noise. Although this technique may use entangled coincident photon pairs over an identical optical path, it still requires two independent single photon detectors and a temporal coincidence gate to extract transmitted data.

SUMMARY

An embodiment of the present invention may be directed to the application of entangled-photon spectroscopy in secure communications. Information may be sent through the minute temporal modulation of the fourth-order coherence, that is a summation of entanglement time and interbeam delay between two photons. For example, in an embodiment of the invention, quantum entangled two-photon spectroscopy may be used with subsequent detection of the radiated fluorescence photon. Only one detector is needed and no temporal coincidence gate is required to effect secure optical communications. This is because the molecule absorption itself acts as a coincident counter.

An embodiment of the invention is directed to an optical communications apparatus for coding optical signals by tuning delay time between a pair of quantum entangled photons. The apparatus includes means for implementing a non-linear optical process to generate the pair of quantum entangled photons and an interferometer to receive the pair of quantum entangled photons to generate an entangled-photon beam. The apparatus also includes an electro-optical system to encode the entangled photon pairs, wherein a relative path delay between the pair of quantum entangled photons are tuned or modulated. The apparatus further includes a transmitter to transmit the pair of quantum entangled photons. The pair of quantum entangled photons is received at an absorber where absorption followed by fluorescence emission occurs at a certain wavelength based on an encoded relative path delay in the pair of quantum entangled photons. A fluorescence signal is thereafter detected by a detector.

Another embodiment of the invention is directed to an apparatus for receiving a pair of quantum entangled photons for optical communications. The apparatus includes an absorber to receive the pair of quantum entangled photons, wherein at the absorber, either absorption followed by fluorescence emission or transparency (no absoprtion) occur at a certain wavelength, based on an encoded relative path delay in the pair of quantum entangled photons. The apparatus also includes a detector to detect a fluorescence signal, wherein the fluorescence signal is detected by the detector through a narrow band filter optimized for fluorescence wavelength.

Another embodiment of the invention is directed to a system including a generating unit to implement a non-linear optical process to generate a pair of quantum entangled photons, to encode an entangled photon pairs, wherein a relative path delay between the pair of quantum entangled photons are tuned, and to transmit the pair of quantum entangled photons. The system also includes a receiving unit to receive the pair of quantum entangled photons, to absorb the pair of quantum entangled photons by a molecular fluorescer followed by fluorescence emission at a certain wavelength, based on an encoded relative path delay in the pair of quantum entangled photons. The emission is then detected by a detector.

Another embodiment of the invention is directed to a method including generating pairs of quantum entangled photos via a non-linear optical process and receiving a pair of quantum entangled photons to generate an entangled-photon beam. The method also includes encoding the entangled photon pairs, wherein a relative path delay between the pair of quantum entangled photons are tuned or modulated and transmitting the pair of quantum entangled photons to a receiver. At the receiver, the pair of quantum entangled photons is absorbed and fluorescence emission occurs at a certain wavelength, based on an encoded relative path delay in the pair of quantum entangled photons. A fluorescence signal is then detected by a detector.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF EMBODIMENTS

In an embodiment of the present invention, optical signals may be coded by tuning or modulating delay time (fourth-order coherence) between pairs of entangled twin photons. The photon pairs may be absorbed by a molecular fluorescer followed by corresponding fluorescent optical emissions at a certain wavelength. The fluorescent optical emissions may then be detected by a photon detector. An example of the molecular fluorescer may be a specially synthesized fluorophore. A molecular absorber may act as a coincidence counter for an entangled photon pair. Thus, the quantum fourth-order interference, that is entanglement, is explicitly met in an embodiment of the invention without a use of a pair of detectors connected with coincident circuit.

Figure 1:
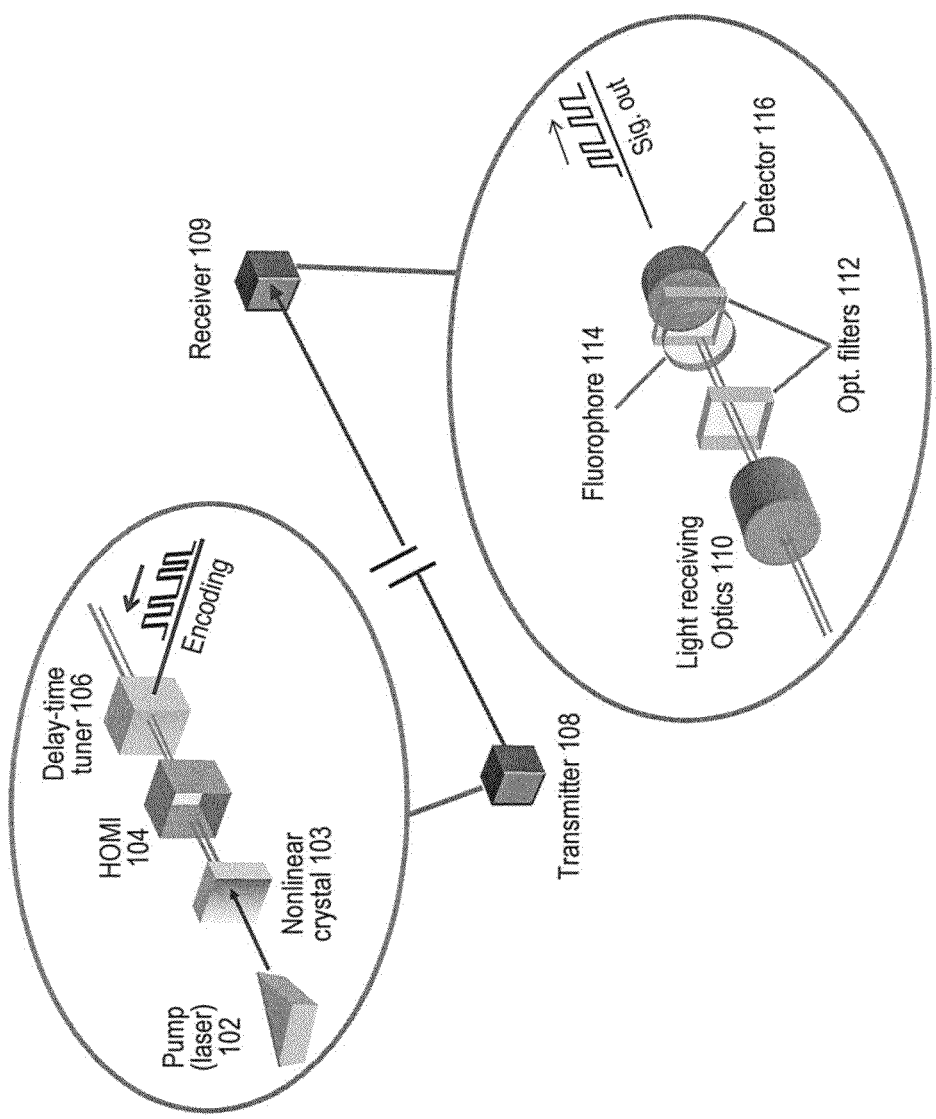
FIG. 1 illustrates an implementation of an optical communication using quantum entangled-photon transparency (absorption) modulation spectroscopy.

FIG. 1 illustrates an implementation of an optical communication using quantum entangled-photon transparency (absorption) modulation spectroscopy. Pairs of quantum entangled photons may be generated via nonlinear optical process, such as a spontaneous parametric down-conversion (SPDC), and may be directed to an interferometer so that a convenient entangled-photon "beam" can be obtained. FIG. 1 shows a nonlinear second-order crystal 103 pumped by a laser 102. Alternatively, SPDC may be arranged so that the pair of output photons may be emitted co-linearly. The interferometer 104 may be a Hong-Ou-Mandel beamsplitter interferometer (HOMI).

Communication link can be made through either fiber optic or free space. The entangled photon pairs may be encoded by an electro-optical system 106 in which the relative path delay between the two photons may be tuned or modulated. The photon pairs exited from a transmitter 108 to a receiver 109 may then be collected by a receiving collection optics 110. A narrow band-pass filter 112 and selective absorption on fluorophore 114 may block out ambient light noise. Finally, the entangled photon pairs may arrive at the absorber (fluorophore) 114 where either absorption followed by fluorescence emission or transparency may take place based on the relative path delay encoded in the transmitter 108. When absorption occurs, the subsequent fluorescence signal may then be detected by detector 118 through another narrow band-pass filter optimized for the fluorescence wavelength. When transparency occurs, original pump may be pass through the absorber and may be blocked by the second narrow band-pass filter 116.

As shown in FIG. 1, molecular absorber 114 may act as a coincidence counter for an entangled photon pair. Thus, the quantum forth-order interference, i.e. entanglement, is explicitly met in the medium shown in FIG. 1.

Figure 2:
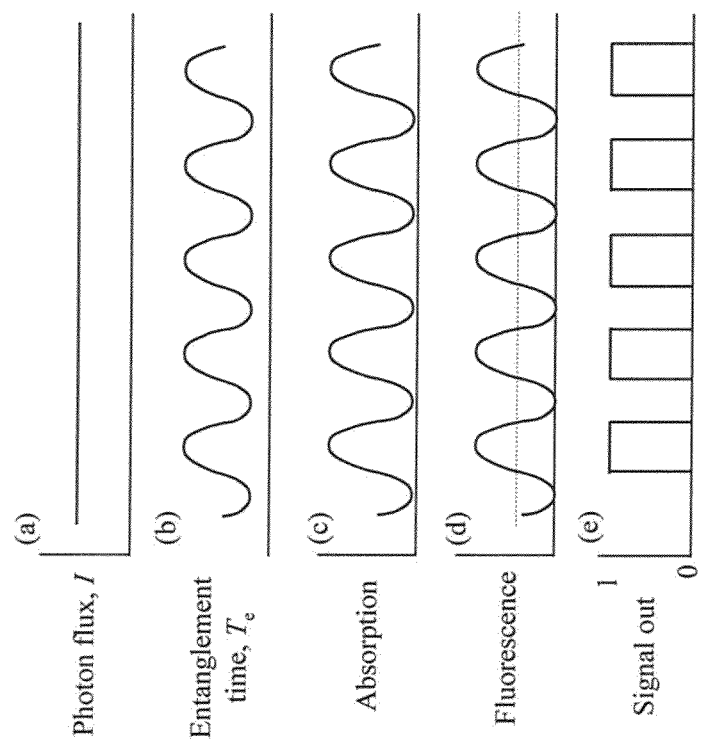
FIG. 2 illustrates a schematic diagram of signal coding by means of entangled two-photon transparency (absorption) modulation in arbitrary units.

Because the entanglement-based absorption process, unlike classical optical absorption process, has a strong dependence on the time-of-flight difference between the photon pairs, i.e. entanglement time, a delay time tuning applied to the exiting photon pairs in a transmitter can inhibit or enhance the absorption rate at the receiver and thus modulate or code the signal, as shown in FIG. 2.

FIG. 2 illustrates a schematic diagram of signal coding by means of entangled two-photon absorption modulation. Photon flux I (intensity) of the signal carrier, i.e. entangled photon pairs is constant, as shown in 2a, while the entanglement time $T_e$ of each photon pair is modulated or tuned by a relative path delay system, as shown in 2b. Because $T_e$ dominates the two-photon absorption cross-section $\sigma_e$ of a medium (fluorophore) at a receiver site, the absorption rate is tuned as well from nearly transparent to nearly full absorption, as shown in FIG. 2c. By setting an appropriate threshold to the subsequent fluorescence intensity, as shown in FIG. 2d, followed by the absorption, the digital signal is realized, as shown in FIG. 2e.

Figure 3:
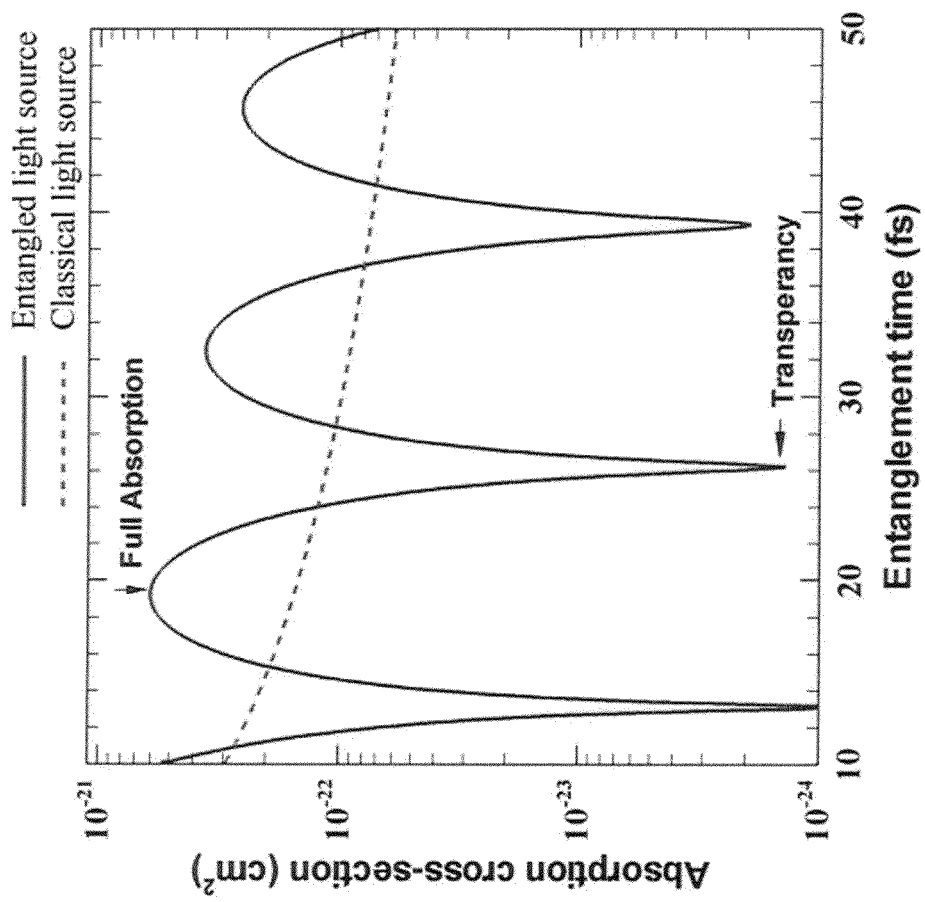
FIG. 3 illustrates unique orders-of-magnitude variation of entangled two-photo absorption rate, theoretically calculated for hydroxyl molecules.

FIG. 3 illustrates unique orders-of-magnitude variation of entangled two-photon absorption rate. This quantum phenomenon may enable "switching" between an absorption and a transparency, thus a signal coding.

Communications realized from an embodiment of the present invention are highly secured because the code is hidden in a "tiny" bit of time difference in an entangled-state photon pair. This is analogous to steganography with photographic microdot that has features smaller than resolvable by any classical optical technique. Measurements of raw light intensities appear to be random photon arrivals exhibiting a constant average photon flux, as shown in FIG. 2a. Current state-of-art photon detectors (pico-second resolution) cannot decode the femto-second-encoded signal. Furthermore, longer wavelength due to the two-photon technique and correlated state of the entangled photons improve immunity to various levels of optical effects/irregularity on the path.

Embodiments of the present invention could benefit the development of an advance optical communication technology by adding another significant layer of communications security on top of an optical direct link capacity. The transmitted two-photon wavelength can be optimized for eye-safe operation in the near infrared (IR), for example 800-1400 nm, where the transmittance in the atmosphere is also better, while the radiated fluorescence from a fluorescer would be conveniently located in visible wavelength at which detectors have better sensitivity and are robust even in a harsh environment when compared with state-of-art near IR and IR detectors. Examples of harsh environments may include battlefields or aerospace vehicles.

Embodiments of the present invention also provide the unique capability of immunity to irregularities in the optical path, for example polarization effects, due to the explicitly correlated state, that is, polarization-entangled state with the energy-momentum conservation. In this case, the two-photon pairs are best generated using type-I spontaneous parametric down-conversion (SPDC) so that the effects of atmospheric birefringence is minimized.

Embodiments of the present invention also provide the enhancement of the signal-to-noise through the use of optical filters and selective absorption of a molecular fluorescer that does not produce any light unless exited by two-photon absorption.

Embodiments of the present invention further provide the ability to be used for both free-space and fiber optic applications as diode lasers are readily available to generate SPDC two-photon pairs at both 1350 nm and 1550 nm which are the optimal wavelengths for low-loss transmission through optical fibers. Additionally, these popular wavelengths permit the use of low cost off-the-shelf optical coatings and components to be used for maximum throughput.

Embodiments of the present invention, therefore provide an architecture for secure optical communications using quantum entangled molecular transparency modulation spectroscopy. Embodiments of the invention provide for the spectroscopic use of a molecular absorber as both the entangled two-photon detector and the femto-second-resolved coincidence gate circuit that decodes information transmitted as minute temporal shifts between the entangled photon pairs. The two-photon absorption rate is modulated not by changing wavelength or intensity of the light source but by varying the entanglement time (the fourth-order phase coherence) between the photon pairs with femto-second resolution. Upon the absorption of the entanglement-time-modulated two-photons by an appropriate molecular species that re-emits the absorbed two-photons in the form of blue-shifted fluorescence, the transmitted signal is then detected using conventional electronic means. The quantum entangled bi-photon absorption-rate is a fourth-order coherent process that offers a novel way to convey information because conventional detectors and electronics cannot resolve the femtosecond-encoded information of the individual photon pairs. An embodiment of the invention may be demonstrated with more than 20 dB (contrast) modulation of the two-photon absorption rate which should enable reliable high-speed digital communications, while maintaining zero modulation of the average two-photon flux or intensity.

Therefore, a system and method is disclosed wherein optical signals are coded by tuning or modulating the interbeam delay time (which modulates the fourth-order coherence) between pairs of entangled photons. The photon pairs are either absorbed or not absorbed (transparent) by an atomic or molecular fluorescer, depending on the inter-beam delay that is introduced in the entangled photon pairs. Upon the absorption, corresponding fluorescent optical emissions follow at a certain wavelength, which are then detected by a photon detector. The advantage of the disclosed system is that it eliminates a need of a coincidence counter to realize the entanglement because an atomic or molecular absorber acts as both a pair of detectors and a coincidence counter for entangled photon pairs. Thus, a simpler system is developed for detecting coincidences between entangled photon pairs for the purposes of quantum communications. Another advantage is that the disclosed system enhances security of the optical communication because the code is hidden in the very minute modulation, on the order of femto-seconds. The inter-arrival time difference between the photon pairs is revealed only through a specific and specially-designed absorbing material, but not by standard fast opto-electronics.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. An optical communications apparatus for coding optical signals by tuning interbeam delay time using the femtosecond timescale between a pair of entangled photons, comprising:
    means for implementing a non-linear optical process to generate the pair of quantum entangled photons;
    an interferometer to receive the pair of quantum entangled photons to generate a entangled-photon beam;
    an electro-optical system to encode entangled photon pairs, wherein a relative path delay between the pair of quantum entangled photons are tuned or modulated using femtosecond resolution; and
    a transmitter to transmit the pair of quantum entangled photons, wherein the pair of quantum entangled photons are received at an absorber where absorption followed by fluorescence emission occur at a certain wavelength, based on an encoded relative path delay of femtoseconds in the pair of quantum entangled photons, and
    wherein a fluorescence signal is detected by a detector.

2. The apparatus of claim 1, wherein the fluorescence signal is detected by the detector through a narrow band filter optimized for fluorescence wavelength.

3. The apparatus of claim 1, wherein communication links are through either fiber-optic or free space.

4. The apparatus of claim 1, wherein upon receipt of the pair of quantum entangled photons by collection optics, a narrow band-pass filter and selective absorption on a fluorophore block out ambient light noise.

5. The apparatus of claim 1, wherein the interferometer is a Hong-Ou-Mandel beamsplitter interferometer.

6. The apparatus of claim 1, wherein the non-linear optical process is a spontaneous parametric down-conversion.

7. The apparatus of claim 6, wherein the spontaneous parametric down-conversion is arranged so that the pair of quantum entangled photons are emitted co-linearly.

8. The apparatus of claim 1, wherein a molecular absorber acts as a coincidence counter for the pair of quantum entangled photons so that quantum fourth-order interference is explicitly met.

9. The apparatus of claim 1, wherein delay-time tuning applied to the pair of quantum entangled photons inhibits or enhances absorption rate at a receiver.

10. An apparatus for receiving a pair of quantum entangled photons for optical communications, comprising:
    an atomic or molecular absorber to receive the pair of quantum entangled photons, wherein at the absorber either absorption followed by fluorescence emission or transparency occur at a certain wavelength based on an encoded relative path or interbeam time delay, tuned or modulated using femtosecond resolution, in the pair of quantum entangled photons; and
    a detector to detect a fluorescence signal, wherein the fluorescence signal is detected by the detector through a narrow band-pass filter optimized for fluorescence wavelength.

11. The apparatus of claim 10, wherein the absorber is an atomic or molecular fluorescer.

12. The apparatus of claim 11, further comprising a narrow band-pass filter, wherein the narrow band-pass filter and selective absorption on the fluorophore block out ambient light noise in the received pair of quantum entangled photons.

13. The apparatus of claim 10, wherein the incoming entangled photo pairs pass through the absorber, and thus generates no fluorescence signal emission when the two-photon absorption rate is lowest, that is a transparent state, due to a specific interbeam delay is introduced to the entangled photon pairs; and
    the incoming entangled photo pairs are absorbed by the absorber thus generates a fluorescence signal emission when the two-photon absorption rate is highest, that is an absorption state, due to a specific interbeam delay is introduced to the entangled photon pairs.

14. The apparatus of claim 10, wherein the absorber is an atomic or molecular absorber which acts as both a detector and a coincidence counter for the pair of quantum entangled photons so that quantum fourth-order interference is explicitly met.

15. The apparatus of claim 10, wherein delay-time tuning applied to the pair of quantum entangled photons inhibits or enhances absorption rate at a receiver.

16. A system for optical communications, comprising:
    a generating unit to implement a non-linear optical process to generate a pair of quantum entangled photons, to encode an entangled photon pairs, wherein a relative path-length delay between the pair of quantum entangled photons are tuned using the femtosecond resolution and to transmit the pair of quantum entangled photons; and
    a receiving unit to receive the pair of quantum entangled photons, to absorb the pair of quantum entangled photons within the femtosecond timescale by a molecular fluorescer followed by fluorescence emission occur at a certain wavelength based on an encoded femtosecond relative time delay in the pair of quantum entangled photons, wherein the emission is detected by a detector.

17. A method, comprising:
- generating pairs of quantum entangled photos via a non-linear optical process;
- receiving a pair of quantum entangled photons to generate a entangled-photon beam;
- encoding the entangled photon pairs, wherein a relative path delay between the pair of quantum entangled photons are tuned or modulated using femtosecond resolution; and
- transmitting the pair of quantum entangled photons to a receiver, wherein, at the receiver, the pair of quantum entangled photons are absorbed and fluorescence emission occur at a certain wavelength based on an encoded femtosecond relative time delay in the pair of quantum entangled photons, and wherein a fluorescence signal is detected by a detector.

18. The method of claim 17, wherein the fluorescence signal is detected by the detector through a narrow band-pass filter optimized for fluorescence wavelength.

19. The method of claim 17, wherein upon receipt of the pair of quantum entangled photons, a narrow band-pass filter and selective absorption on a fluorophore block out ambient light noise.

20. The method of claim 17, further comprising emitting the pair of quantum entangled photons co-linearly.

* * * * *